Patented Aug. 21, 1945

2,383,055

UNITED STATES PATENT OFFICE 2,383,055

POLYMERIZATION OF CONJUGATED DIENES

Charles F. Fryling, Silver Lake, Ohio, assignor to The B. F. Goodrich Company, New York, N. Y., a corporation of New York No Drawing. Application March 28, 1941, Serial No. 385,757

10 Claims. (Cl. 260—84.5)

This invention relates to the polymerization of conjugated butadiene hydrocarbons either alone or in admixture with other compounds polymerizable therewith and is particularly concerned with a new method for effecting such polymerization. More specifically this invention relates to a process of polymerizing conjugated butadiene hydrocarbons in presence of inorganic compounds containing both sulfur and oxygen which compounds normally function as reducing agents, and to the products thereby obtained.

It is well known that useful polymers, for example, rubber-like materials or so-called "synthetic rubbers" may be obtained on a commercial scale from conjugated butadiene hydrocarbons or mixtures containing a conjugated butadiene hydrocarbon only when the polymerization is effected in presence of a substance which materially increases or accelerates the rate of polymerization. Heretofore certain oxygen yielding compounds or oxidizing agents such as hydrogen peroxides, benzoyl peroxide, potassium persulfate and sodium perborate have been employed for this purpose and such compounds have been referred to variously as "polymerization catalysts," "polymerization accelerators" or "polymerization promoters." However, it now seems more nearly accurate to refer to these compounds as "polymerization initiators" since it is fairly certain that such compounds initiate the polymerization reaction by some chemical change and are themselves at least partially used up during the polymerization process. This terminology is particularly desirable since other types of compounds which exert a quite different action and which may also be present during the polymerization have been discovered and have been termed "polymerization accelerators" or "polymerization catalysts."

When polymerization of conjugated butadiene hydrocarbons is effected in presence of the known polymerization initiators such as hydrogen peroxide which are also oxidizing agents, it is important that only small amounts of the initiator be employed, otherwise the initiator is not all used up during the polymerization process and the excess amount functions as an oxidizing agent, increasing the cross-linking of the polymeric product or degrading the polymer chains both of which are exceedingly undesirable because of the harmful effect on the properties of the polymers produced. The regulation of the precise amount of oxygen yielding initiator is not a simple problem since other oxygen yielding compounds which function as initiators may also inadvertently be present, formed by the atmospheric oxidation of the materials polymerized or of other essential ingredients of the polymerization mixture, for example, soaps or other emulsifying agents used in the common emulsion polymerization processes. Hence it is often desirable that a polymerization initiator which is not also an oxidizing agent be employed, but this has not heretofore been possible since all the known effective initiators are oxygen yielding compounds or oxidizing agents and some workers in the art have come to believe that only oxidizing agents are capable of initiating the polymerizing reaction.

I have now discovered, quite unexpectedly, that inorganic compounds containing both sulfur and oxygen which normally function as reducing agents are also capable of initiating the polymerization of conjugated butadiene hydrocarbons or monomer mixtures containing a conjugated butadiene hydrocarbon. The new initiators of polymerization are normally reducing agents since all of the sulfur atoms present in these compounds is in a lower state of valency, i. e., a valency of two or four, and therefore these compounds are readily converted or oxidized to a compound in which sulfur has its normal maximum valence of six. Included in this class of compounds are the lower oxides of sulfur, the oxyacids derived therefrom (the so-called "ous" acids of sulfur), and the salts, acid chlorides and other derivatives of these acids, for examples, sulfur monoxide SO, sulfur dioxide $SO_2$, sulfurous acid $H_2SO_3$, dithionous or hyposulfurous acid $H_2S_2O_4$, sulfoxylic or hydrosulfurous acid, thiosulfurous acid $H_2S_2O_3$, pyrosulfurous acid $H_2S_2O_5$, thionyl chloride $SOCl_2$ and the various sulfites, bisulfites, sulfoxylates, dithionites or hyposulfites and the like. The preferred compounds in the class are sulfur dioxide, sulfurous acid, sodium sulfite or other water soluble sulfites, and bisulfites, the water soluble sulphoxylates (hydrosulfites) and the water soluble dithionites (hyposulfites). The particular compound preferred will depend somewhat upon the conditions of polymerization and upon the nature of other substances, if any, present during the polymerization process, as will be explained more fully hereinafter.

It is quite surprising that these compounds which have a low oxidation-reduction potential and are strong reducing agents should initiate the polymerization of conjugated butadiene hydrocarbons since it has formerly been necessary to employ a compound which has a high oxidation-reduction potential and which is a strong oxidizing agent in order to effect a rapid polymerization. It is even more surprising that sulfur dioxide should be capable of initiating the polymerization of conjugated butadiene hydrocarbons since it has frequently been stated that sulfur dioxide would not accelerate such a polymerization but would react with the conjugated butadiene to form a sulfone.

As has been mentioned hereinabove these new initiators of polymerization may be employed in the polymerization of conjugated butadiene hydrocarbons alone or in the polymerization of mixtures containing one or more conjugated butadiene hydrocarbons and one or more compounds copolymerizable therewith known as comonomers. Thus, they may be employed in the polymerization of such conjugated butadiene hydrocarbons as butadiene-1,3, hereinafter referred to by its common name of butadiene, isoprene, dimethyl butadiene and piperylene or mixtures of these, and in the polymerization of monomer mixtures containing one or more conjugated butadiene hydrocarbons such as butadiene and also containing one or more comonomers including aryl olefins and substituted aryl olefins such as styrene, p-chloro styrene, p-methoxy styrene, vinyl naphthalene and the like, acrylic and methacrylic acids, esters, nitriles and amides such as acrylic acid, acrylonitrile, methacrylonitrile, methyl acrylate, methyl methacrylate, butyl acrylate, methacrylamide and the like, vinylidene chloride, vinyl ketones, such as methyl vinyl ketone, vinyl ethers, vinyl carbazole, vinyl furane and the like, all of which comonomers contain the polymerizable group

having at least one of the dangling valences connected to a negative group. Other comonomers which may be polymerized with a conjugated butadiene hydrocarbon in accordance with this invention include dialkyl esters of olefin dicarboxylic acids such as diethyl fumarate, diallyl esters of dibasic acids such as diallyl adipate, and other unsaturated esters such as vinyl crotonate and the like, and other compounds known to form copolymers with conjugated butadiene hydrocarbons. When a mixture of a conjugated butadiene hydrocarbon and a comonomer are polymerized in the presence of the polymerization initiators of this invention it is preferable that the comonomer be employed in minor proportions by weight, or in proportions which will yield a rubber-like material upon polymerization.

Any of the well known methods may be employed to carry out the polymerization. Thus, polymerization may be effected in a homogeneous system as by heating the monomeric material either with or without a solvent in the presence of one of the initiators of this invention, which in this case is preferably sulfur dioxide because sulfur dioxide is soluble in the monomers employed. However, it is preferred to conduct the polymerization in a heterogeneous system such as an aqueous emulsion. In this process the monomer or monomer mixture is emulsified in water with the aid of a suitable emulsifying agent such as partially or completely neutralized fatty acid soaps or other soap-like materials, for examples, sodium lauryl sulfate, sodium isobutyl naphthalene sulfonate and the like, and polymerization is then effected by adding the initiator and agitating the emulsion until the polymer is formed. The particular form of the initiator employed in the emulsion polymerization process will depend somewhat upon the emulsifying agent present and particularly upon the acidity or pH of the emulsion. If, for example, sulfur dioxide is selected as the initiator, it may be present as sulfurous acid when the emulsion has a low pH, as an alkali bisulfite when the emulsion is of intermediate pH or as an alkali sulfite when the emulsion is of a high pH. On the other hand, the sulfur dioxide may remain dissolved in the non-aqueous phase of the emulsion throughout the process. Although it is preferred to add the initiator to the emulsion after it is formed this is not essential and it may be added either to the monomers or to the aqueous solution of emulsifying agent before emulsification occurs.

The initiators of this invention may be used in varying amounts depending upon the substances polymerized and the conditions for the polymerization. For example when sulfur dioxide is employed as the initiator for the polymerization of a mixture of butadiene and acrylonitrile or methyl methacrylate in aqueous emulsion to produce a synthetic rubber, it is desirable to employ from 0.1 to 2% of sulfur dioxide by weight based on the weight of the monomers polymerized. If sodium sulfite, sodium bisulfite, sulfurous acid or some other initiator disclosed hereinabove be substituted for the sulfur dioxide, equivalent proportions should be employed. Generally there is no particular advantage to be gained in employing over 5% by weight of the initiator and amounts somewhat smaller than this are usually desirable.

Any other substances which influence the course of the polymerization or which modify the properties of the polymers obtained may be present in the polymerization batch along with the initiators of this invention without destroying the action of either. Polymerization modifiers such as dialkyl dixanthogens, diaryl disulfides, thiuram disulfides and other organic sulfur containing compounds which are known to increase the solubility and plasticity of the polymeric product may be employed as may be substances which accelerate the polymerization reaction such as heavy metal salts or other heavy metal systems such as are disclosed in copending applications of William D. Stewart, Serial Numbers 379,712 to 379,717, inclusive, filed February 19, 1941. Moreover, the initiators of this invention which are reducing agents may be used together with the common initiators which are oxidizing agents such as hydrogen peroxide, potassium persulfate and the like, the result being that the polymerization reaction is initiated rapidly while the undesirable after effect of excess oxidizing initiators is destroyed.

The following examples illustrates more fully the practice of this invention and the desirable results thereby obtained:

*Example I*

An aqueous emulsion is made up of the following ingredients:

| | | |
|---|---|---|
| Butadiene | grams | 55 |
| Acrylonitrile | do | 45 |
| Sulfur dioxide | do | 1 |
| Sodium lauryl sulfate (2% solution) | cc | 250 |
| Polymerization modifier | grams | 0.3 |

This emulsion is agitated for 40 hours at a temperature of 30° C. and is then coagulated by the addition of a mixture of dilute sulfuric acid and alcohol. A 96% yield of a plastic coherent rubber-like polymer is obtained. This polymer is 95% soluble in benzene, and when compounded in a standard recipe and vulcanized it yields a soft rubber-like vulcanizate having a tensile strength of 5600 lbs./sq. in. and an ultimate elongation of 640%.

*Example II*

An emulsion containing the following ingredients is prepared:

| | |
|---|---|
| Butadiene grams | 75 |
| Acrylonitrile do | 25 |
| Sodium sulfite do | 0.6 |
| Sodium lauryl sulfate (2% solution) cc | 250 |
| Sulfuric acid (10% solution) do | 2 |

This emulsion has a pH value of 9.6. Upon polymerization as in Example I, a rubber-like copolymer is obtained in 34 hours. The copolymer is 52% soluble in benzene and yields a vulcanizate having a tensile strength of 5500 lbs./sq. in. and a 610% elongation. A similar copolymer prepared with hydrogen peroxide as the initiator required 85 hours to form, was only 36% soluble in benzene and yielded a vulcanizate of only 4300 lbs./sq. in. tensile and 560% elongation.

*Example III*

An emulsion have a pH value of 3.0 is prepared from 60 g. of butadiene, 40 g. of methyl methacrylate, 250 cc. of a 2% aqueous solution of sodium lauryl sulfate, 4 cc. of 10% sulfuric acid and a sulfurous acid solution containing 0.8 g. of sulfur dioxide. This emulsion is polymerized in 155 hours yielding a good rubber-like polymer. When employing hydrogen peroxide as the initiator under the same conditions only an inferior product is obtained.

*Example IV*

An emulsion containing 70 g. of butadiene, 30 g. of styrene, 250 cc. of an 85% neutralized aqueous myristic acid solution, 0.3 g. of a polymerization modifier, 0.1 g. of sulfur dioxide and .075 g. of sodium ferri pyrophosphate is polymerized for 120 hours at 30° C. An excellent polymer is obtained in 95% yield.

*Example V*

An aqueous emulsion containing 75 g. of butadiene, 25 g. of acrylonitrile, 250 cc. of a 3% aqueous solution of sodium palmitate and 0.5 g. of sodium hydrosulfite is polymerized for 75 hours at a temperature of 30° C. A coherent rubber-like copolymer is obtained in good yield.

*Example VI*

An aqueous emulsion is prepared from 60 g. of butadiene, 40 g. of methyl methacrylate, 250 cc. of a 2% aqueous solution of sodium lauryl sulfate, 3 cc. of 10% sulfuric acid and 1.2 g. of sodium bisulfite. When polymerized for 84 hours at 30° C. this emulsion yields a copolymer which gives a vulcanizate having a tensile strength of 4200 lbs./ sq. in., and an ultimate elongation of 690%.

The foregoing examples shows that several unexpected advantages accrue from the use of a reducing agent such as sulfur dioxide as the polymerization initiator. The products prepared in Example 2 are more soluble in benzene and yield vulcanizates having better mechanical properties than those prepared when using a previously known initiator such as hydrogen peroxide. Moreover the reducing initiators of this invention may be employed in the polymerization of emulsions over a wide range of pH while with hydrogen peroxide or similar oxygen yielding initiators the polymerization proceeds rapidly only when there is an alkaline pH. Since the regulation of the pH of the emulsion is somewhat difficult and may be changed by such a variety of factors, particularly in commercial practice, this is a distinct but entirely unexpected advantage.

Although the invention has been specifically disclosed in several representative examples it is not intended to limit it thereto for many modifications will occur to those skilled in the art. Accordingly, it is intended that the invention be limited only by the appended claims.

I claim:

1. The process which comprises polymerizing a conjugated butadiene hydrocarbon in aqueous emulsion in the presence of an inorganic compound containing both sulfur and oxygen, which normally functions as a reducing agent.

2. The process which comprises polymerizing a monomer mixture including a conjugated butadiene hydrocarbon and a comonomer containing the structure

wherein at least one of the dangling valences is connected to a negative group, in aqueous emulsion in the presence of an inorganic compound containing both sulfur and oxygen, which normally functions as a reducing agent.

3. The process which comprises polymerizing a monomer mixture of butadiene-1,3 and a comonomer containing the structure

wherein at least one of the dangling valences is connected to a negative group, in aqueous emulsion in the presence of an oxide of sulfur which normally functions as a reducing agent.

4. The process which comprises polymerizing a monomer mixture of butadiene-1,3 and a comonomer containing the structure

wherein at least one of the dangling valences is connected to a negative group, in aqueous emulsion in the presence of an oxyacid of sulfur which normally functions as a reducing agent.

5. The process which comprises polymerizing a monomer mixture of butadiene-1,3 and a comonomer containing the structure

wherein at least one of the dangling valences is connected to a negative group, in aqueous emulsion in the presence of a water-soluble salt of an oxyacid of sulfur which normally functions as a reducing agent.

6. The process which comprises polymerizing a conjugated butadiene hydrocarbon in aqueous emulsion in the presence of sulfur dioxide.

7. The process which comprises polymerizing a monomer mixture of a conjugated butadiene hydrocarbon and a comonomer containing the structure

wherein at least one of the dangling valences is connected to a negative group, in aqueous emulsion in the presence of sulfur dioxide.

8. The process which comprises polymerizing a mixture including butadiene-1,3 and acrylonitrile in aqueous emulsion in the presence of sulfur dioxide.

9. The process which comprises polymerizing a mixture including butadiene-1,3 and methyl methacrylate in aqueous emulsion in presence of sulfur dioxide.

10. The process which comprises polymerizing a mixture including butadiene-1,3 and acrylonitrile in aqueous emulsion in the presence of a water soluble sulfite.

CHARLES F. FRYLING.